UNITED STATES PATENT OFFICE.

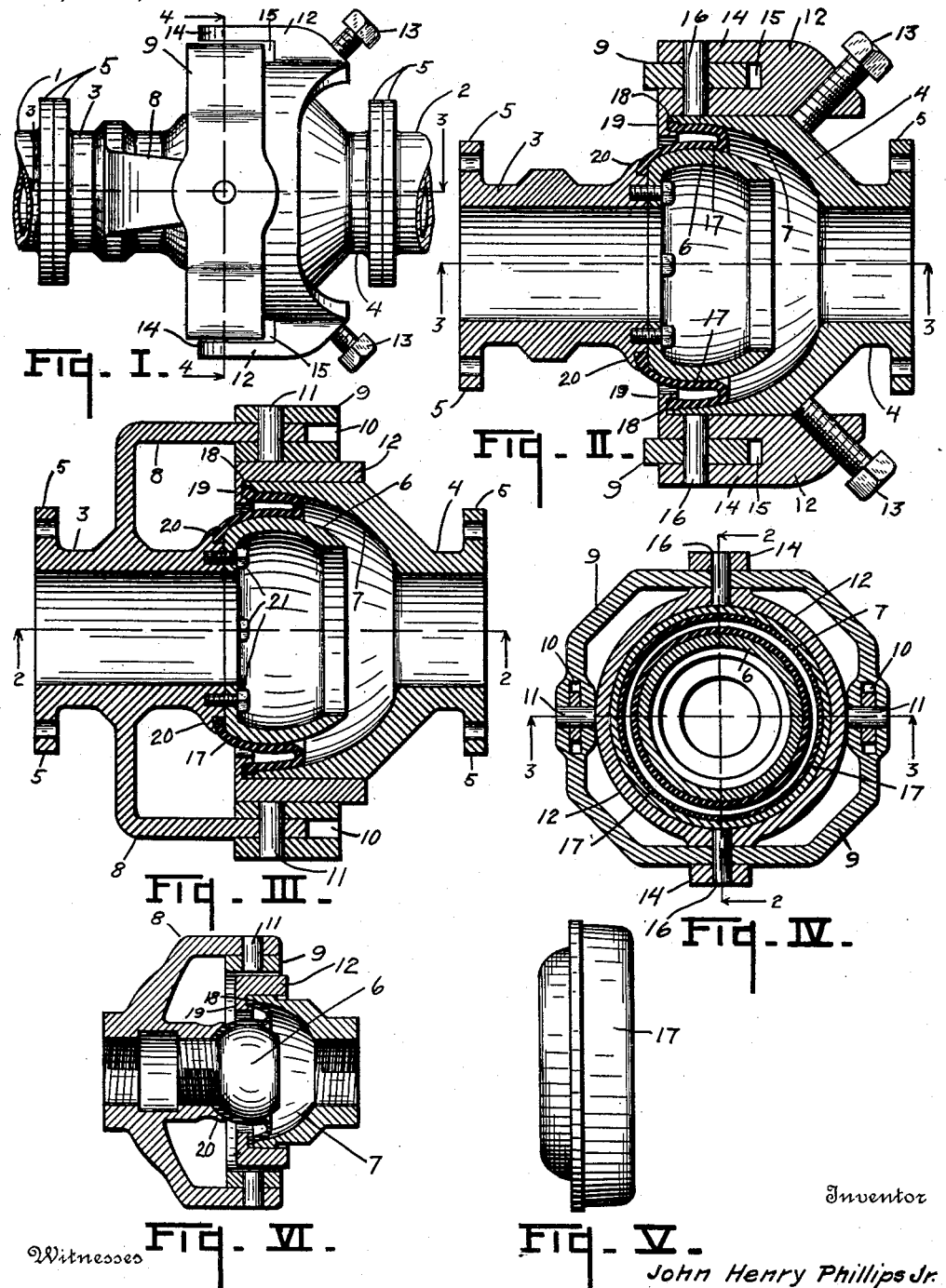

JOHN HENRY PHILLIPS, JR., OF JACKSON, MICHIGAN, ASSIGNOR TO PHILLIPS METALLIC HOSE CO., OF JACKSON, MICHIGAN.

FLEXIBLE PIPE-JOINT.

1,220,270.  Specification of Letters Patent.  Patented Mar. 27, 1917.

Application filed January 4, 1915. Serial No. 386.

*To all whom it may concern:*

Be it known that I, JOHN HENRY PHILLIPS, Jr., a citizen of the United States, residing at Jackson, Michigan, have invented certain new and useful Improvements in Flexible Pipe-Joints, of which the following is a specification.

This invention relates to improvements in flexible pipe joints.

My present improvements relate particularly to the class of pipe joints shown in Letters Patent No. 1,117,962, dated November 17, 1914, and is an adaptation and in some respects an improvement upon the structure there illustrated.

The main object of my present invention is to provide an improved flexible pipe joint which is well adapted for use on suction or vacuum pipes.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a structure embodying the features of my invention, the pipes to which the joint is attached being broken away.

Fig. II is a detail horizontal section on a line corresponding to line 2—2 of Figs. III and IV, the pipes being omitted.

Fig. III is a detail longitudinal section on a line corresponding to line 3—3 of Figs. I, II, and IV.

Fig. IV is a transverse section on a line corresponding to line 4—4 of Fig. I.

Fig. V is a side view of the flexible joint member.

Fig. VI is a detail longitudinal section corresponding to that of Fig. II of a slightly modified structure.

In the drawings, similar reference characters refer to similar parts throughout the several views, and the sectional views are taken looking in the direction of the little arrows at the ends of the section lines.

Referring to the drawings, 1 and 2 represent the pipes to be coupled. The male coupling member 3 is connected to the pipe 1 and the female coupling member 4 is connected to the pipe 2. The pipes and coupling members are provided with connecting flanges 5. The male coupling member 3 has a spherically curved nipple 6 projecting into the socket 7 of the female coupling member, the socket being also spherically curved. The socket is of a substantially greater diameter than the male coupling member so that the male coupling member may swing freely within it without contacting with the walls thereof. The members are supported in their coacting relation so that the nipple 6 swings within the socket by a universal joint connection.

In the structure illustrated this universal joint connection consists of the forks or arms 8 on the male coupling member, a ring 9 slotted at 10 to receive the ends of the arms 8 and provided with pivots 11 for the arms, and a joint member 12 mounted upon the female coupling member and retained thereon by means of the screws 13. The joint member 12 is provided with ears 14 spaced from the body to form slot-like openings 15 in which the ring 9 is a rocking fit. The ring is mounted upon the member 12 by means of the pivots 16. The pivots 16 are disposed at right angles to the pivots 11. The annular flexible joint member 17 is preferably formed of rubber and is substantially U-shaped in cross section, its inner end being turned inwardly within its outer portion. The outer portion of the flexible joint member is substantially cylindrical, while its inner portion is tapered or conical. The outer portion of the flexible joint member fits within the socket of the female member and is supported by the walls thereof. The female member is provided with an internal annular groove 18 in which the edge of the outer arm of the joint member is disposed and clamped by the channeled flange 19 of the joint member 12. The male member 3 is provided with an external annular groove 20 in which the edge of the inner arm of the joint member is clamped by the nipple 6.

In the structure shown in detail in Figs. II and III the nipple is secured by the screws 21. In the structure shown in Fig. VI the nipple 6 is threaded into the male member, the edge of the joint member being clamped by the nipple. In this embodiment of my invention the ring member 9 is not slotted to receive the ends of the arms 8.

The joint member 17 is disposed to face outwardly so that the suction within the pipe tends to hold it in place. It is supported by the socket of the female member and the spherical nipple of the male member so that the strain of external pressure thereon is minimized and it is also supported at the point of flexing so that as the joint swings it rocks upon or wraps over the spherical nipple.

I thus provide a very secure joint and one which is capable of embodiment in large sizes and still effectively withstands the pressure to which it is subjected. The wear upon the joint member is minimized and it flexes freely and without any cramping or binding action. Further, it is not subjected to frictional wear in the manner of the ordinary packing rings in a ball and socket joint, and I secure the advantages of a universal joint without the necessity of accurate fitting of the parts and the wear resulting from friction of the parts.

Having thus described my invention, what I claim as new and desire to secure by Letters Patent, is:

1. In a pipe coupling, the combination of a male and a female member, said male member having a nipple removably secured thereto and an external annular groove at its inner end, said female member having an internal annular groove at its inner end, an annular joint member of flexible material U-shaped in cross section arranged within said female member with the edge of its outer arm in the said internal annular groove thereof, the inner arm of said joint member being arranged upon the nipple of said male member with its edge in the said external annular groove thereof, means for securing said nipple to said male member whereby the edge of the said joint member is clamped in said groove thereof, and a universal joint connection for said members whereby the male member is supported to swing within said female member, one of the joint members constituting a means for clamping the edge of said joint member in said internal groove of said female member.

2. In a pipe coupling, the combination of a male and a female member, said male member having a nipple removably secured thereto and an external annular groove at its inner end, said female member having an internal annular groove at its inner end, an annular joint member of flexible material U-shaped in cross section arranged within said female member with the edge of its outer arm in the said internal annular groove thereof, the inner arm of said joint member being arranged upon the nipple of said male member with its edge in the said external annular groove thereof, means for securing said nipple to said male member whereby the edge of the said joint member is clamped in said groove thereof, a universal joint connection for said members whereby the male member is supported to swing within said female member, and means for clamping the edge of said joint member in said internal groove of said female member.

3. In a pipe coupling, the combination of a male and a female member, said male member having a nipple removably secured thereto and an external annular groove at its inner end, an annular joint member of flexible material U-shaped in cross section arranged within said female member with its outer arm secured thereto, the inner arm of said joint member being arranged upon the nipple of said male member with its edge in the said external annular groove thereof, means for securing said nipple to said male member whereby the edge of the said joint member is clamped in said groove thereof, and a universal joint connection for said members whereby the male member is supported to swing within said female member.

In witness whereof, I have hereunto set my hand and seal in the presence of two witnesses.

JOHN HENRY PHILLIPS, JR. [L. S.]

Witnesses:
H. A. REECE,
P. E. LIPSCOMBE.

Copies of this patent may be obtained for five cents each, by addressing the "Commissioner of Patents, Washington, D. C."